United States Patent
Trimarco (10) Patent No.: US 11,691,185 B2
(45) Date of Patent: Jul. 4, 2023

(54) CLEANING/DRYING SYSTEM

(71) Applicant: SIMPLE PRODUCT DESIGNS INC., Dix Hills, NY (US)

(72) Inventor: Joseph V. Trimarco, Dix Hills, NY (US)

(73) Assignee: SIMPLE PRODUCT DESIGNS INC., Dix Hills, NY (US)

( * ) Notice: Subject to any disclaimer, the term of this patent is extended or adjusted under 35 U.S.C. 154(b) by 177 days.

(21) Appl. No.: 17/122,529

(22) Filed: Dec. 15, 2020

(65) Prior Publication Data

US 2021/0252558 A1  Aug. 19, 2021

Related U.S. Application Data

(60) Provisional application No. 62/977,474, filed on Feb. 17, 2020.

(51) Int. Cl.
*B08B 13/00* (2006.01)
*B08B 1/00* (2006.01)
*B60S 3/00* (2006.01)

(52) U.S. Cl.
CPC ........... *B08B 1/006* (2013.01); *B08B 1/007* (2013.01); *B60S 3/002* (2013.01)

(58) Field of Classification Search
None
See application file for complete search history.

(56) References Cited

U.S. PATENT DOCUMENTS

| | | | |
|---|---|---|---|
| 1,136,358 A * | 4/1915 | Park ..................... | B60R 25/005 70/202 |
| 8,375,500 B1 * | 2/2013 | Aguirre ................. | A46B 9/005 15/245 |
| 2001/0034890 A1 * | 11/2001 | Levas .................... | A41D 13/04 2/48 |
| 2004/0134803 A1 * | 7/2004 | Michelson ............. | A47L 13/52 15/257.7 |
| 2006/0153627 A1 * | 7/2006 | Mathis .................. | A47L 1/08 401/263 |
| 2007/0169296 A1 * | 7/2007 | McDonald ............. | A47L 13/26 15/210.1 |
| 2008/0028554 A1 * | 2/2008 | Chu ....................... | B25G 1/102 15/105 |
| 2018/0178858 A1 * | 6/2018 | Hollman ............... | B62D 23/005 |
| 2018/0325343 A1 | 11/2018 | McMurray et al. | |

FOREIGN PATENT DOCUMENTS

EP  0808753 A1 * 11/1997

* cited by examiner

*Primary Examiner* — Eric W Golightly
(74) *Attorney, Agent, or Firm* — Kunzler Bean & Adamson (57) ABSTRACT

Apparatuses, systems, and methods are disclosed for a cleaning/drying system. An apparatus includes an elongate member that includes a first portion extending linearly along a first axis from a proximal end to a distal end, a second portion extending linearly along a second axis from a proximal end to a distal end, and a joint member configured to couple the proximal end of the first portion and the proximal end of the second portion to one another. The joint member is configured to angle the second portion relative to the first portion such that the first and second axes intersect. The apparatus includes a towel that is selectively coupled to the second portion. The towel is configured for absorbing liquids from a surface in response to the towel being moved across the surface using the elongate member.

18 Claims, 11 Drawing Sheets

FIG. 13

CLEANING/DRYING SYSTEM

CROSS-REFERENCES TO RELATED APPLICATIONS

This application claims the benefit of U.S. Provisional Patent Application No. 62/977,474 entitled "An application that makes drying cars faster." and filed on Feb. 17, 2020, for Joseph V. Trimarco, which is incorporated herein by reference.

FIELD

This invention relates to a cleaning/drying system and more particularly relates to an apparatus for drying hard-to-reach areas.

BACKGROUND

After washing an object such as a vehicle, it may be desirable to dry the object, e.g., to prevent water spots on the object. However, if the object has parts that are out of the reach of a user, the user may resort to using other means for reaching the hard-to-reach parts such as ladders, step-stools, buckets, etc., which may potentially be dangerous and cumbersome to user.

SUMMARY

Apparatuses, systems, and methods are disclosed for a cleaning/drying system. An apparatus, in one embodiment, includes an elongate member that includes a first portion extending linearly along a first axis from a proximal end to a distal end, a second portion extending linearly along a second axis from a proximal end to a distal end, and a joint member configured to couple the proximal end of the first portion and the proximal end of the second portion to one another. The joint member, in some embodiments, is configured to angle the second portion relative to the first portion such that the first and second axes intersect. The apparatus, in various embodiments, includes a towel that is selectively coupled to the second portion. The towel may be configured for absorbing liquids from a surface in response to the towel being moved across the surface using the elongate member.

A system, in one embodiment, includes an elongate member that includes a first portion extending linearly along a first axis from a proximal end to a distal end, a second portion extending linearly along a second axis from a proximal end to a distal end, and a joint member configured to couple the proximal end of the first portion and the proximal end of the second portion to one another. The joint member, in some embodiments, is configured to angle the second portion relative to the first portion such that the first and second axes intersect. The system, in various embodiments, includes a cleaning attachment selectively coupled to the distal end of the second portion.

In one embodiment, a method includes adjusting a position of a first portion of an elongate member relative to a second portion of an elongate member the first and second portions coupled to one another at a joint member. A method, in further embodiments, includes attaching a towel to the second portion of the elongate member. In certain embodiments, a method includes placing towel on a wet surface and moving the towel across the wet surface using the elongate member to absorb liquid from the wet surface.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Apparatuses, systems, and methods are disclosed for a cleaning/drying system. An apparatus, in one embodiment, includes an elongate member that includes a first portion extending linearly along a first axis from a proximal end to a distal end, a second portion extending linearly along a second axis from a proximal end to a distal end, and a joint member configured to couple the proximal end of the first portion and the proximal end of the second portion to one another. The joint member, in some embodiments, is configured to angle the second portion relative to the first portion such that the first and second axes intersect. The apparatus, in various embodiments, includes a towel that is selectively coupled to the second portion. The towel may be configured for absorbing liquids from a surface in response to the towel being moved across the surface using the elongate member.

In one embodiment, the joint member is adjustable such that the second portion is pivotably moveable about a radial axis relative to the first portion. In some embodiments, the joint member comprises a locking plate hinge that the proximal end of the first portion and the proximal end of the second portion are coupled to and that allows the second portion to pivot about the radial axis relative to the first portion.

In one embodiment, the joint member comprises a locking ball joint that the proximal end of the first portion and the proximal end of the second portion are coupled to and that allows the second portion to pivot about the radial axis relative to the first portion. In some embodiments, the joint member comprises a fixed angle joint that the proximal end of the first portion and the proximal end of the second portion are selectively coupled to.

In some embodiments, the proximal end of the first portion and the proximal end of the second portion are connected to one another by an elastic cord that runs through the fixed angle joint such that the proximal end of the second portion is removable from the fixed angle joint while remaining connected to the proximal end of the first portion via the elastic cord running through the fixed angle joint.

In one embodiment, at least one of the first portion and the second portion are telescopically extendable. In certain embodiments, the apparatus includes at least one handle on the first portion for gripping the first portion. The at least one handle may include one of a rubber grip, a strap, a foam handle, and a protruding handle that is oriented along a third axis that is perpendicular to the first axis.

In certain embodiments, the apparatus includes a clip attached to the first portion and configured to receive the second portion when the second portion is removed from the joint member. In certain embodiments, the towel comprises a sleeve along an edge of the towel that is configured to receive the distal end of the second portion. The sleeve may include an elastic fit on at least one opening of the sleeve for securing the towel onto the second portion.

In one embodiment, the towel includes a plurality of fasteners along an edge of the towel that selectively fit one or more corresponding fastener receiving members along a length of the second portion for securing the towel onto the second portion. In various embodiments, the plurality of fasteners and corresponding fastener receiving members comprises at least one of buttons, snaps, and hook-and-loop fasteners.

In one embodiment, the second portion comprises a slit that an edge of the towel is configured to slide into to secure the towel to the second portion. The towel may include a rigid member along an edge of the towel that prevents the towel from falling out of the slit and the distal end may include a cap for preventing the towel from sliding out of the slit.

In various embodiments, the second portion comprises a protruding hook near the proximal end of the second portion and the towel comprises a sleeve along an edge of the towel that includes a loop member at an opening of the sleeve that is fixed to the towel. The sleeve may be configured to receive the distal end of the second portion until the loop member is attachable to the protruding hook for securing the towel onto the second portion.

In one embodiment, the second portion comprises one or more clips that are actuated to receive the towel and secure the towel to the second portion. In certain embodiments, the second portion is rotatable along a radial axis for rolling the towel around the second portion. In various embodiments, the apparatus includes a plunger member that is slidable along a length of the second portion. The plunger member may engage the rolled towel and wring liquid from the tower as the plunger slides along the length of the second portion.

A system, in one embodiment, includes an elongate member that includes a first portion extending linearly along a first axis from a proximal end to a distal end, a second portion extending linearly along a second axis from a proximal end to a distal end, and a joint member configured to couple the proximal end of the first portion and the proximal end of the second portion to one another. The joint member, in some embodiments, is configured to angle the second portion relative to the first portion such that the first and second axes intersect. The system, in various embodiments, includes a cleaning attachment selectively coupled to the distal end of the second portion.

In one embodiment, the cleaning attachment is selected from the group consisting of a brush head, a squeegee, an absorbent pad, a mop head, a duster, and a sponge.

In one embodiment, a method includes adjusting a position of a first portion of an elongate member relative to a second portion of an elongate member the first and second portions coupled to one another at a joint member. A method, in further embodiments, includes attaching a towel to the second portion of the elongate member. In certain embodiments, a method includes placing towel on a wet surface and moving the towel across the wet surface using the elongate member to absorb liquid from the wet surface.

Figure 1A:
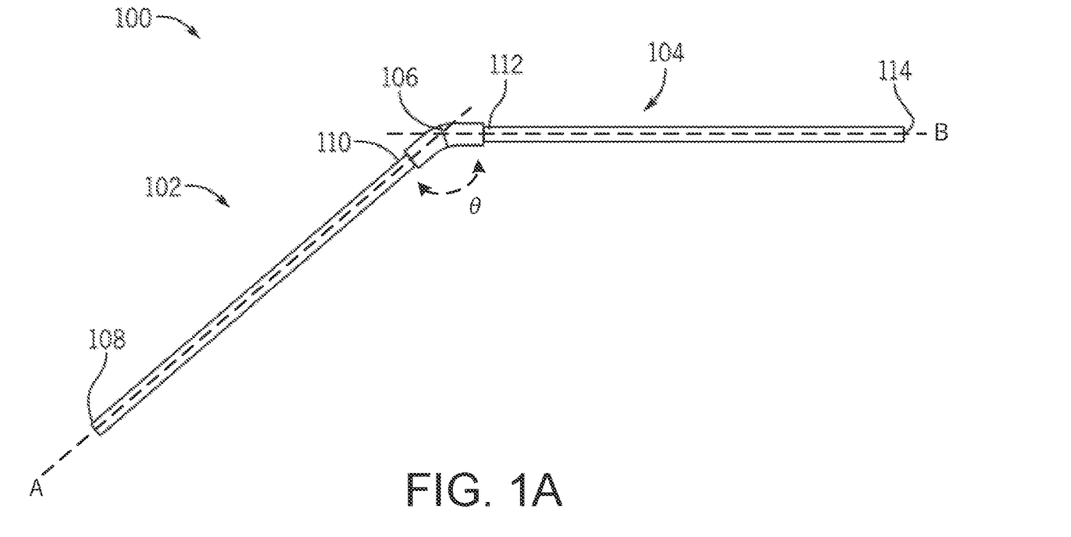
FIG. 1A is a perspective view of one embodiment of an elongate member for a cleaning/drying system in accordance with the subject matter disclosed herein.

FIG. 1A depicts one embodiment of a cleaning/drying system. In the depicted embodiment, the cleaning/drying system includes an elongate member 100 that comprises at least two portions, a first portion 102 comprising a first arm, leg, extension, member, rod, pole, and/or the like, and a second portion 104 comprising a second arm, leg, extension, member, rod, pole, and/or the like. The first 102 and second 104 portions each comprise proximal ends 110, 112 and distal ends 108, 114. The first 102 and second 104 portions each extend linearly along a first axis A and a second axis B, respectively.

In certain embodiments, the first 102 and second 104 portions are hollow. In other embodiments, the first 102 and second 104 portions are solid. The first 102 and second 104 portions may be manufactured of a substantially rigid material such as a metal, e.g., aluminum, steel, and/or the like; a plastic, e.g., a synthetic polymer such as polyvinyl chloride ("PVC"), polyethylene, polypropylene, and/or the like; and/or the like.

In certain embodiments, the first 102 and/or second 104 portions are telescopically extendable up to a predefined length. For instance, the first 102 and/or second 104 portions may include telescoping extensions that can be extended through twisting or screwing/unscrewing, by means of a slide release where a pole release is loosened and tightened, by a button release where a button or lever is depressed to release the extending portions and released to lock the extending portions in place using notches or holes in the pole, and/or the like.

In certain embodiments, the first 102 and second 104 portions are coupled to one another at their proximal ends 110, 112 by a joint member 106. The joint member 106 may be configured to be angled, or angleable, such that the first portion 102 is angled relative to the second portion 104 where the first axis A intersects the second axis B at an angle θ. As explained in more detail below, the joint member 106 may take various forms or configurations, e.g., fixed or configurable, for angling the elongate member 100. In certain embodiments, the first portion 102 may include a hose attachment at the distal end 108 for coupling a hose to the elongate member 100, which allows liquid, e.g., water, air, or the like, to travel through the elongate member 100 from the distal end 108 of the first portion 102 to the distal end 114 of second portion 104 and into various attachments coupled to the distal end 114 of the second portion 104 such as brushes, pads, squeegees, sponges, and/or the like.

In one embodiment, the second portion 104 is configured to receive a cleaning attachment at the distal end 114 such as a towel, brush, squeegee, absorbent pad, and/or the like for drying, dusting, brushing, cleaning, and/or the like hard-to-reach areas such as the roof of a vehicle, a high window, an RV, and/or the like. In such an embodiment, the attachment may be selectively attached to or into the distal end 114, e.g. by threaded means, by a friction fit, and/or the like. In certain embodiments where the cleaning attachment includes a brush, a towel as described herein may be wrapped around the brush and secured using bands, e.g., elastic bands, or the like.

In this manner, a user can save time and potential injury by avoiding standing on a ladder, a bucket, or other object to reach hard-to-reach areas. The cleaning/drying system allows a user, for example, to attach a towel to the second portion, lay the towel on the front hood of a car or truck, and pull or drag the towel over the front hood, windshield, roof, rear window, and trunk/bed to dry the vehicle after washing it, especially the hard-to-reach areas such as the roof.

Figure 1B:
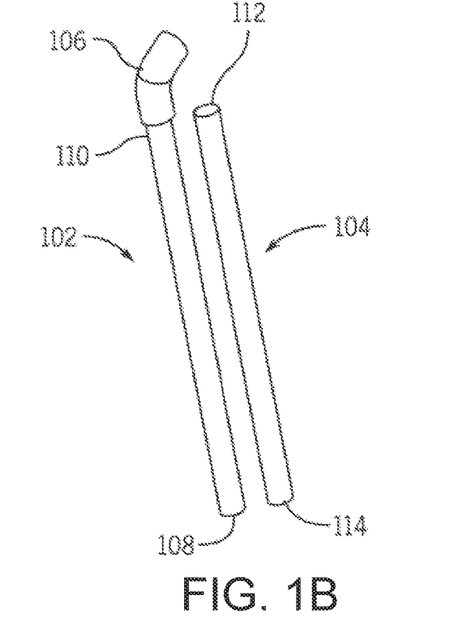
FIG. 1B is a perspective view of another embodiment of an elongate member for a cleaning/drying system in accordance with the subject matter disclosed herein.

As shown in FIG. 1A, the joint member 106 comprises a fixed angle for positioning the first portion 102 at a fixed angle relative to the second portion 104. In one embodiment, shown in FIG. 1B, the first 102 and/or second 104 members are selectively coupleable and/or removable from the joint member 106, e.g., for storage, transport, and/or the like. In such an embodiment, different joint members 106 may be used, each with a different fixed angle θ, e.g., 45°, 90°, 135°, 180°, and/or the like.

Figure 1C:
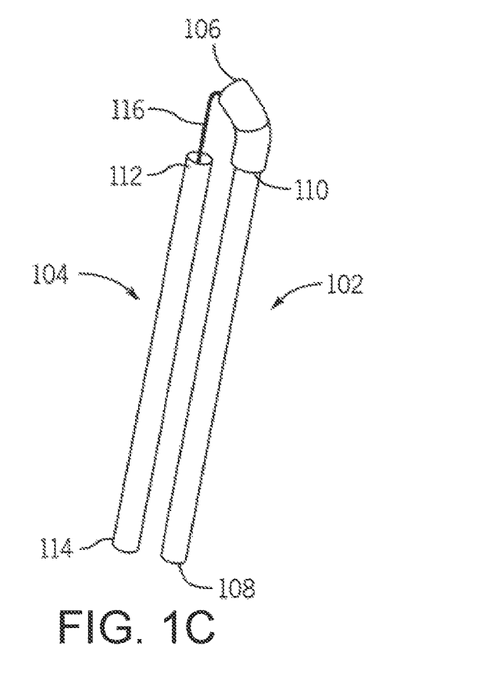
FIG. 1C is a perspective view of another embodiment of an elongate member for a cleaning/drying system in accordance with the subject matter disclosed herein.

In another embodiment, shown in FIG. 1C, the first 102 and/or second 104 members may be coupled to one another through the joint member 106 via a coupling mechanism 116. The coupling mechanism 116 may include an elastic, a string, a rope, a band, and/or the like. In such an embodiment, the first 102 and second 104 portions stay together when they are detached from the joint member 106, which may prevent losing one of the first 102 and second 104 portions.

Figure 2A:
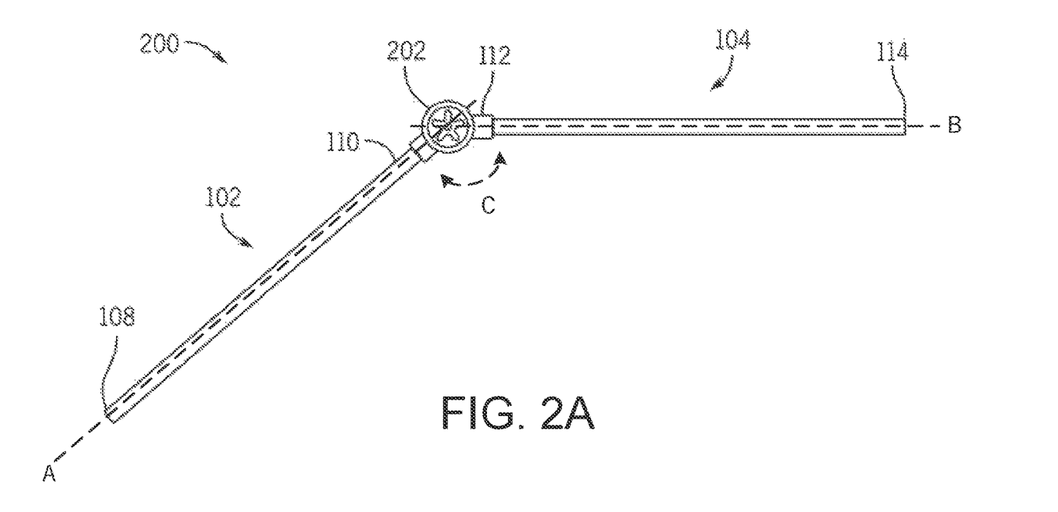
FIG. 2A is a perspective view of another embodiment of an elongate member for a cleaning/drying system in accordance with the subject matter disclosed herein.

FIG. 2A depicts another embodiment of an elongate member 200 that includes first 102 and second 104 portions that are coupled to one another via a joint member 202 that is embodied as a hinge member that provides pivoting movement of the first 102 and second 104 members relative to one another about a radial axis C. In such an embodiment, the joint member 202 may be a locking plate hinge member that allows a user to select a position of the first portion 102 relative to the second portion 104 and then lock the hinge in the selected position using a tightening member such as a screw, bolt, nut, wing nut, and/or the like.

Other hinged joint members 202 may be envisioned for allow selective positioning of the first portion 102 relative to the second portion 104. For instance, the hinged joint member 202 may include a locking ball joint member where a proximal end 110 of the first portion 102 comprises a socket and the proximal end 112 of the second portion 104 comprises a ball (or vice-versa) that is insertable into the socket and may be locked into a selected position.

Figure 2B:
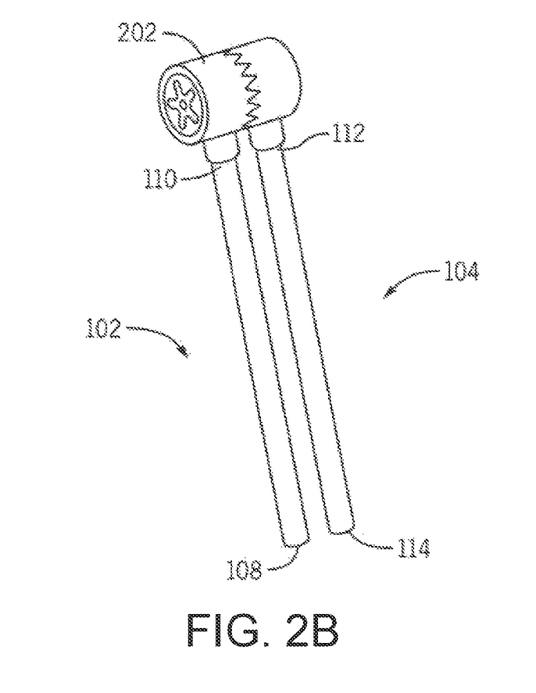
FIG. 2B is a perspective view of another embodiment of an elongate member for a cleaning/drying system in accordance with the subject matter disclosed herein.

In one embodiment shown in FIG. 2B, the hinged joint member 202 allows the elongate member 200 to be folded, collapsed, and/or the like for storage, transport, and/or the like. In such an embodiment, the hinged joint member 202 may be unlocked, loosened, and/or the like, the first 102 and second 104 portions may be moved about the radial axis C such that the first 102 and second 104 portions are next to, proximate to, adjacent to, and/or the like each other, and the hinged joint member 202 may be tightened or locked into place to secure the first 102 and second 104 portions.

Figure 3:
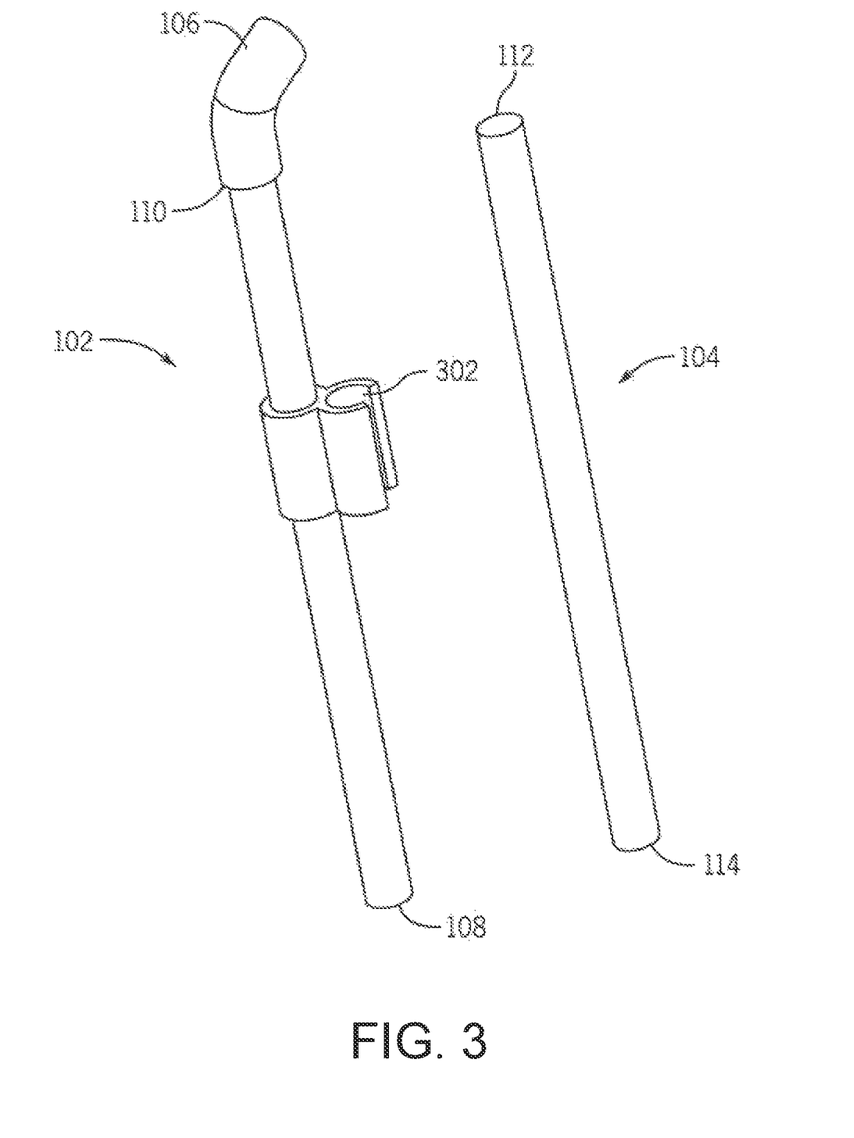
FIG. 3 is a perspective view of an embodiment of coupling one portion of an elongate member to another portion in accordance with the subject matter disclosed herein.

FIG. 3 depicts one embodiment of a means for coupling the second portion 104 to the first portion 102, or vice-versa. In the depicted embodiment, a clip 302 is configured to receive and secure the second portion 104 to the first portion 102 for storage, transport, and/or the like. One of skill in the art will recognize other coupling means in light of this disclosure, including, but not limited to, straps, bands, magnets, hook and loop fasteners, snaps, and/or the like.

Figure 4A:
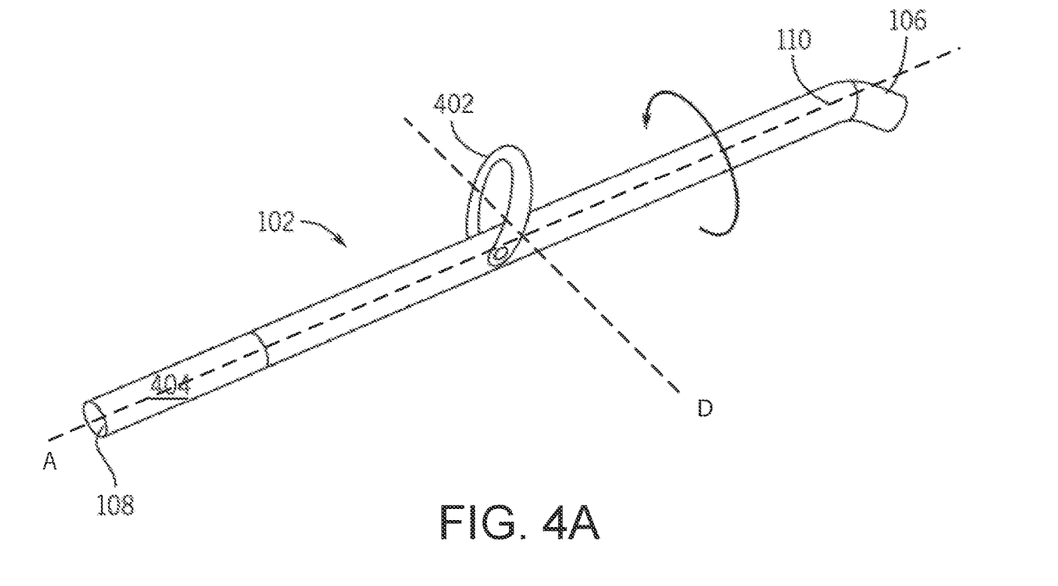
FIG. 4A is a perspective view of one embodiment of an elongate member for a cleaning/drying system in accordance with the subject matter disclosed herein.

FIG. 4A depicts a first portion 104 that includes handles 402, 404 for holding, gripping, and maneuvering the elongate member 100. In the depicted embodiment, the first portion 102 may include a strap 402 located along the first portion 102 at a length that allows the user to maneuver the elongate member 100 while holding a second handle or grip 404 at the distal end 108 of the first portion 102. In such an embodiment, the strap 402 may be a leather strap, a flexible plastic, vinyl, or rubber strap, and/or the like. The second handle 404 may be a rubber grip, a vinyl grip, a foam grip, and/or the like.

Figure 4B:
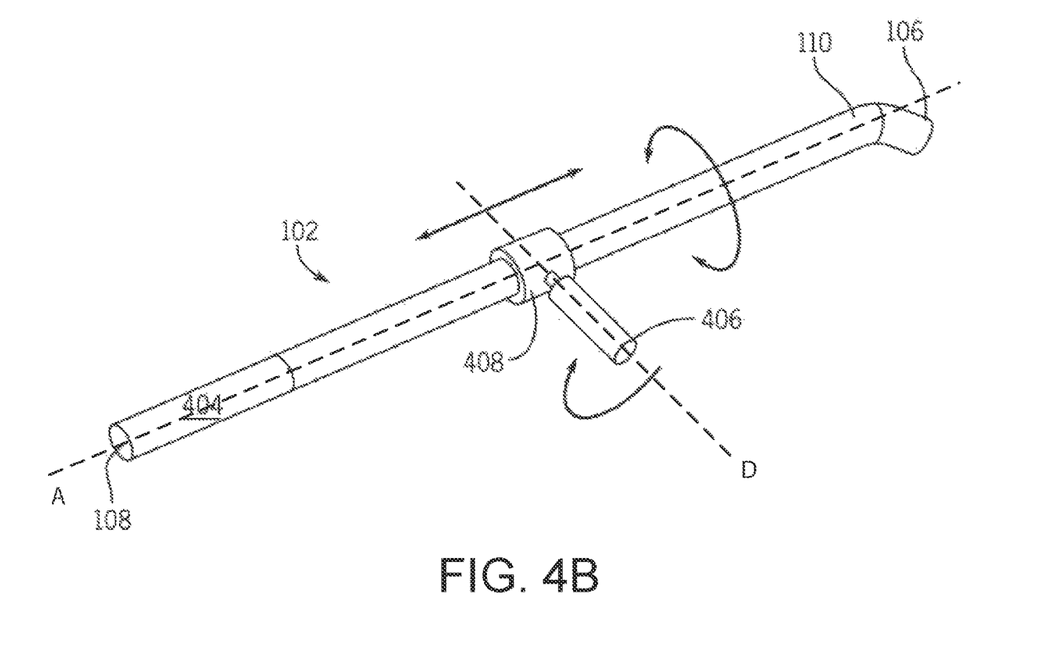
FIG. 4B is a perspective view of another embodiment of an elongate member for a cleaning/drying system in accordance with the subject matter disclosed herein.

FIG. 4B depicts another embodiment of a handle 406 that is selectively coupled to the first portion 102. The handle 406 may be a protruding handle that is oriented along a third axis D that is perpendicular to the first axis A. The handle 406 may include an adjustable portion 408, e.g., a collar, that is configured to tighten and loosen the handle 406 such that the handle 406 can be positioned along the first portion 102. For instance, the protruding member of the handle 406 may act as a set screw that can be turned one direction for fixing or securing the handle 406 to the first portion 102 and/or turned an opposite direction for loosening the handle 406 and allowing the collar to slide up and down a length of the first portion 102 to be positioned as the user desires.

Figure 5:
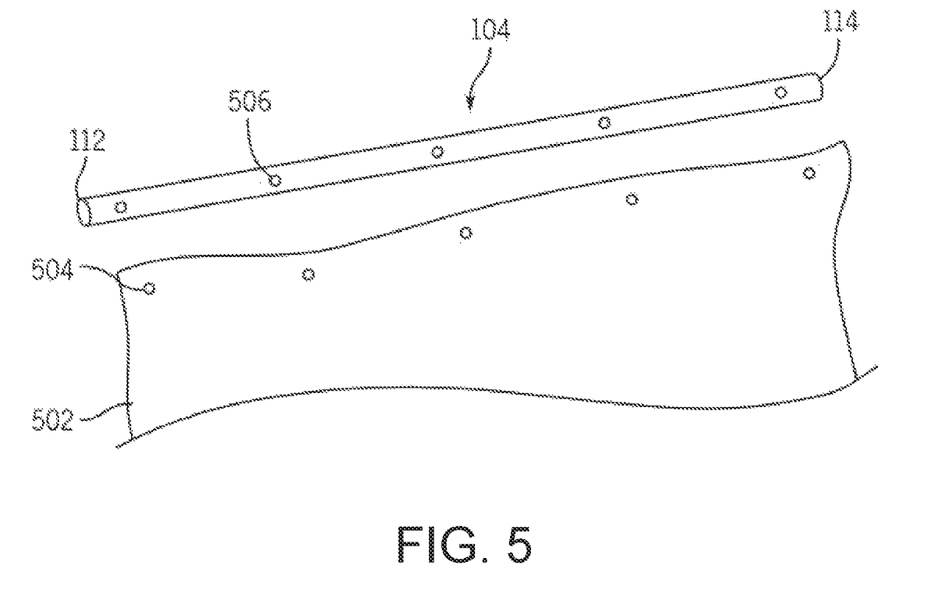
FIG. 5 is a perspective view of one embodiment of attaching a towel to an elongate member for a cleaning/drying system in accordance with the subject matter disclosed herein.

FIG. 5 depicts one embodiment of securing a towel 502 to the second portion 104 of an elongate member 100. In such an embodiment, the towel 502 may comprise a towel 502 that is balanced to absorb an efficient amount of water that provides a dry surface but also allows the towel to be easily dragged over a surface as it absorbs water (e.g., it doesn't absorb too much water to make it difficult to drag).

For instance, in one embodiment, the towel 502 is made of a 70/30 polyester/polyamide 550 grams per square inch blend. In another embodiment, the towel 502 is made of a 100% Korean split microfiber twist loop weave. The edges of the towel 502 may be finished with a butter soft microfiber suede binding edge. The towel 502 may be various sizes and shapes.

In the depicted embodiment, the towel 502 may include a series of snaps or buttons 504 located along a top edge of the towel 502 that correspond to receiving snaps or buttons 506 location along a length of the second portion 104 such that the towel 502 can be secured to the second portion 104 by connecting the snaps or buttons 504 on the towel 502 to the corresponding receiving snaps or buttons 506 on the second portion 104.

Figure 6:
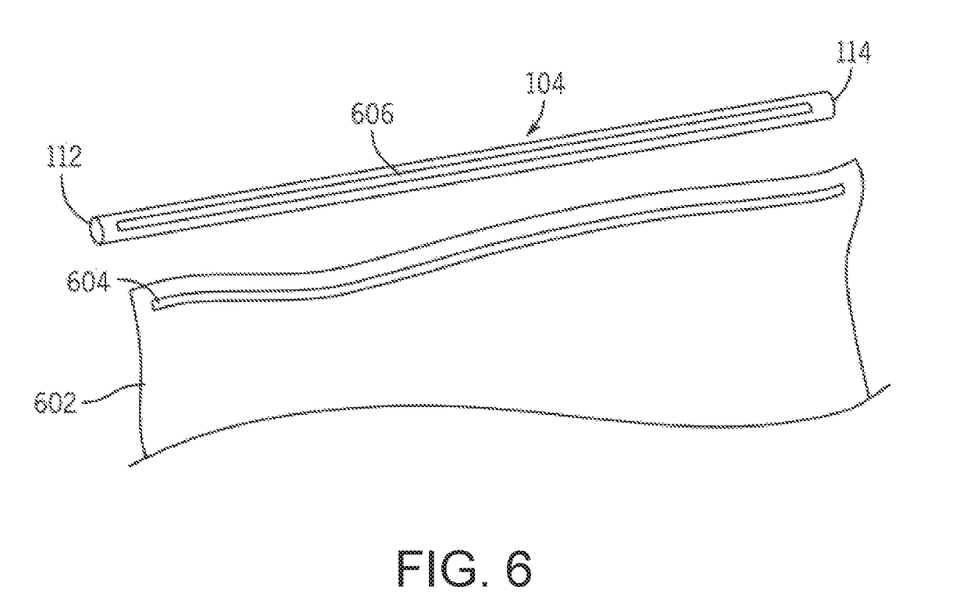
FIG. 6 is a perspective view of another embodiment of attaching a towel to an elongate member for a cleaning/drying system in accordance with the subject matter disclosed herein.

FIG. 6 depicts another embodiment of securing a towel 602 to the second portion 104 of an elongate member 100. The towel 602 may be substantially similar to the towel 502 described above with reference to FIG. 5. In the depicted embodiment, the towel 602 may include a first half 604 of a hook-and-loop fastening system (e.g., Velcro®) along an edge of the towel 602 and a second half 606 of the hook-and-loop fastening system may be located along a length of the second portion 104 that is configured to attach, couple, fasten, or the like to the corresponding first half 604 of the hook-and-loop fastening system for securing the towel 602 to the second portion 104.

Figure 7:
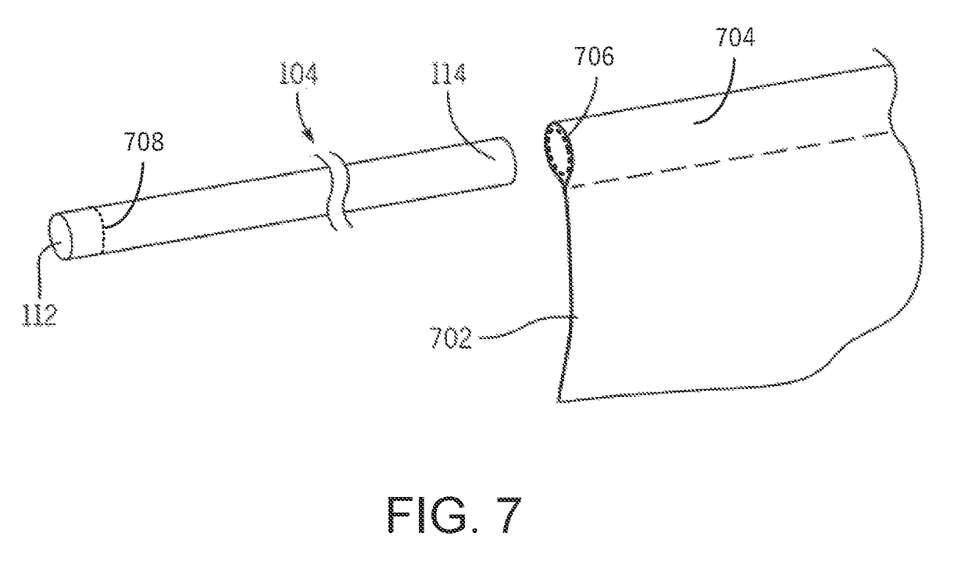
FIG. 7 is a perspective view of another embodiment of attaching a towel to an elongate member for a cleaning/drying system in accordance with the subject matter disclosed herein.

FIG. 7 depicts another embodiment of securing a towel 702 to the second portion 104 an elongate member 100. The towel 702 may be substantially similar to the towel 502 described above with reference to FIG. 5. In the depicted embodiment, the towel 702 may include an edge that forms a sleeve 704 for receiving the second portion 104 of an elongate member 104, from the distal end 114 to the proximal end 112. In certain embodiments, the sleeve 704 portion of the towel 702 may be made of an elastic or otherwise stretchable material that is configured to secure the towel 702 to the second portion 104. In some embodiments, the second portion 104 may taper from the proximal end 112 to the distal end 114 such that it becomes wider or thicker near the proximal end 112, which helps secure the sleeve 704 on the second portion 104 by stretching the sleeve onto the second portion 104 as the second portion 104 widens.

The sleeve 704, in one embodiment, includes an end 706 that is elastic, stretchable, flexible, or the like (e.g., an elastic band or ring) that is configured to secure the towel 702 onto the second portion 104 when the towel 702 is slid or positioned over the second portion 104. In such an embodiment, the second portion 104 may include a securement member 708 that may be embodied as a groove, a protrusion, and/or the like. The securement member 708 may be configured to catch the elastic end 706 of the towel 702 to secure the towel 702 onto the second portion 104 so that it does not slide off the distal end 114 of the second portion 104. For instance, if the securement member 708 is a groove, the elastic end 706 of the towel 702 may be configured to sit within the groove. In another example, if the securement member 708 is a protruding member, e.g., a ridge or ring around the second portion 104, the elastic end 706 may be pulled over the protruding member, which then prevents the elastic end 706 from sliding down the second portion 104 without manually pulling it off the protruding member.

Figure 8A:
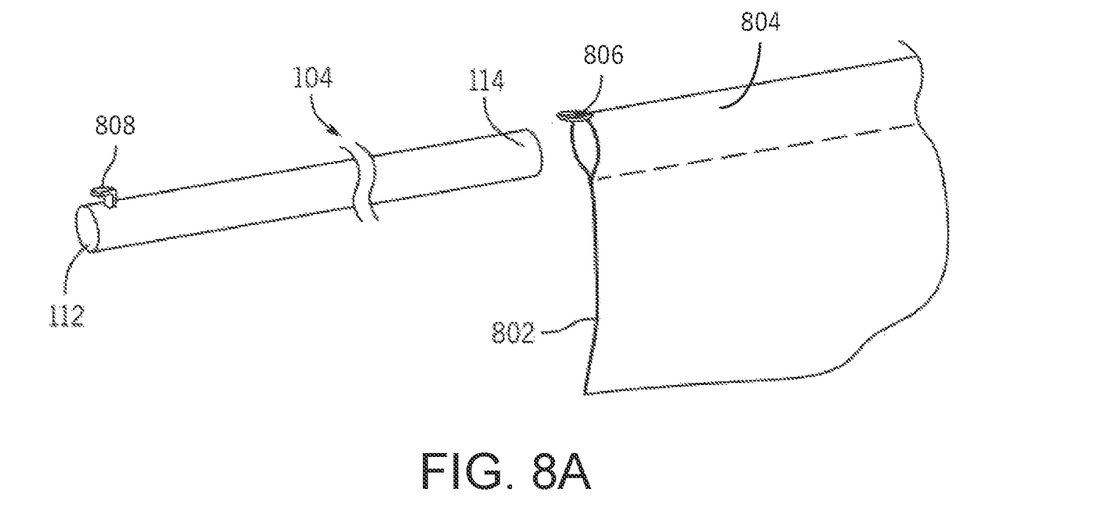
FIG. 8A is a perspective view of another embodiment of attaching a towel to an elongate member for a cleaning/drying system in accordance with the subject matter disclosed herein.

FIG. 8A depicts another embodiment of securing a towel 802 to the second portion 104 an elongate member 100. The towel 802 may be substantially similar to the towel 502 described above with reference to FIG. 5. In one embodiment, the towel 802 includes a sleeve 804 at an edge of the towel for receiving a distal end 114 of the second member 104 and configured to slide along the second portion 104 from the distal end 114 towards the proximal end 112. In further embodiments, the sleeve 804 includes a an attachment member 806 embodied as a loop or the like that is attached to an end of the sleeve 804 and is configured to attach to a corresponding securement member 808 on the proximal end 112 of the second portion 104.

Figure 8B:
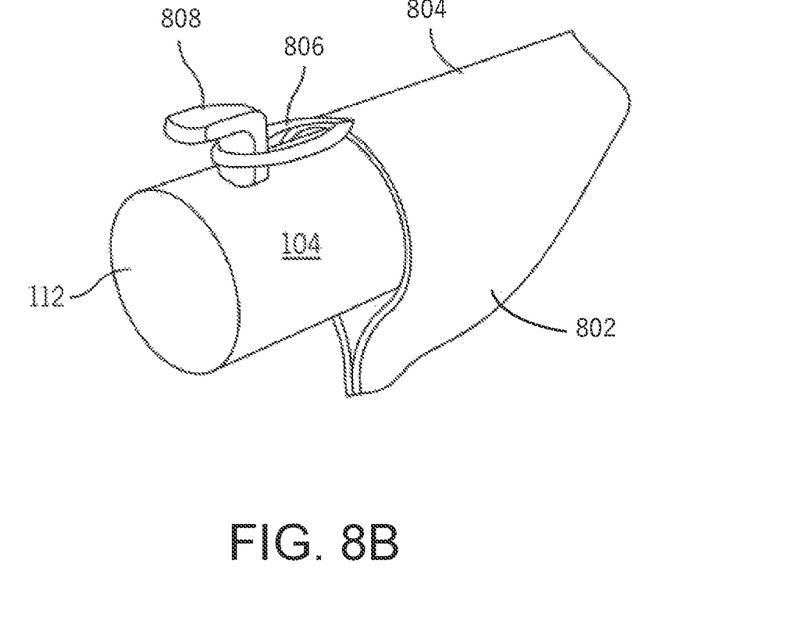
FIG. 8B is a perspective view of another embodiment of attaching a towel to an elongate member for a cleaning/drying system in accordance with the subject matter disclosed herein.

As shown in FIG. 8B, the securement member 808 may be configured as a hook, which catches and prevents the attachment member 806, e.g., the loop, from sliding or coming off when the attachment member 806 on the towel 802 is placed over the securement member 808. In certain embodiments, the sleeve 804 may include a plurality of attachment members 806, e.g., loops, and the second portion includes a plurality of corresponding securement members 808 for securing the towel 802 onto the second portion 104.

Figure 9:
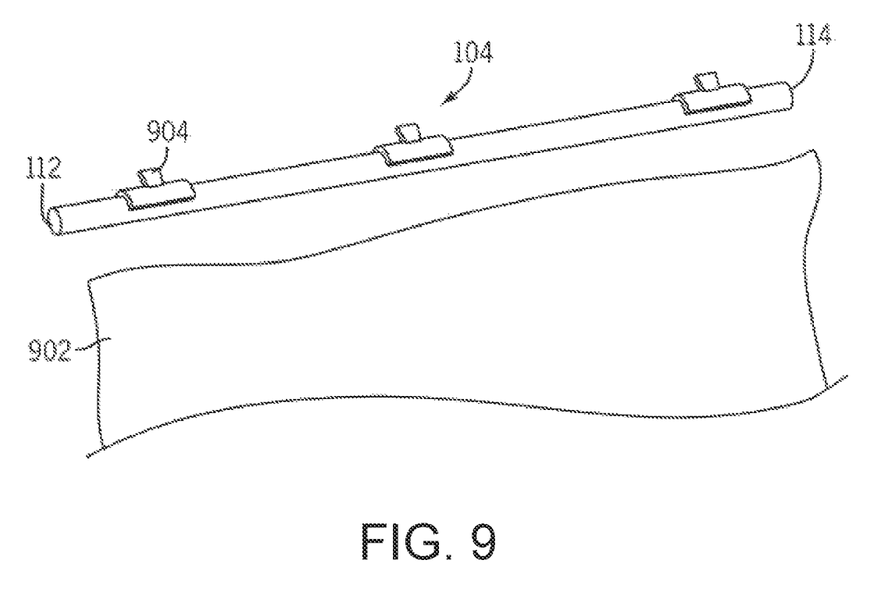
FIG. 9 is a perspective view of another embodiment of attaching a towel to an elongate member for a cleaning/drying system in accordance with the subject matter disclosed herein.

FIG. 9 depicts another embodiment of securing a towel 902 to the second portion 104 an elongate member 100. The towel 902 may be substantially similar to the towel 502 described above with reference to FIG. 5. In one embodiment, the second portion 104 may include one or more clips 904, or similar securement members, that are configured to secure the towel 902 to the second portion 104. The clips 904 may be selectively opened to receive an edge of the towel 902 and then closed to secure the towel 902 to the second portion 104. For instance, the clips 904 may include a tabs that can be actuated to open and close the clips 904 around second portion 104.

Figure 10:
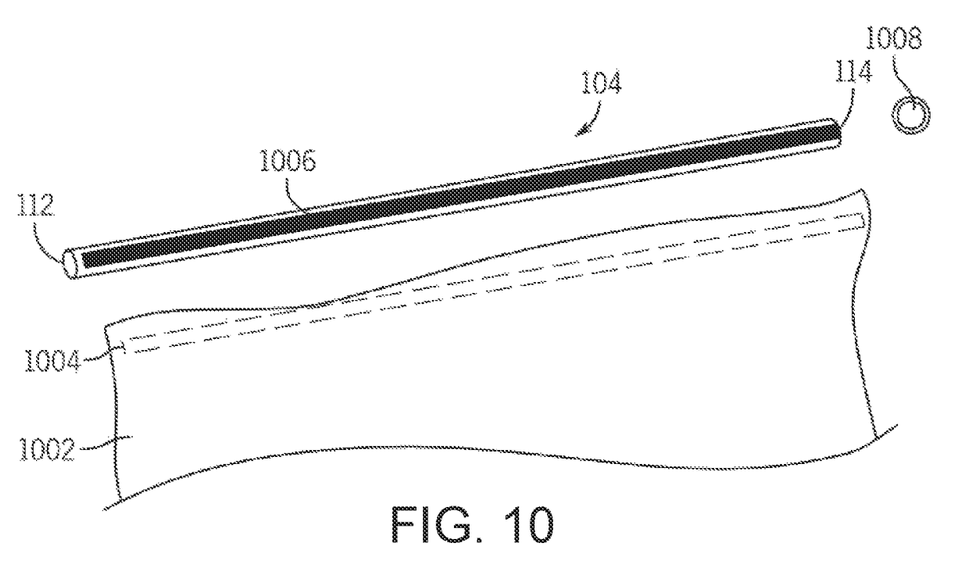
FIG. 10 is a perspective view of another embodiment of attaching a towel to an elongate member for a cleaning/drying system in accordance with the subject matter disclosed herein.

FIG. 10 depicts another embodiment of securing a towel 1002 to the second portion 104 an elongate member 100. The towel 1002 may be substantially similar to the towel 502 described above with reference to FIG. 5. In one embodiment, the towel 1002 includes a rod 1004 that is attached to, sewn into, or the like, an edge of the towel 1002. The second portion 104 may be configured with a slit 1006, slot, or the like such that the edge of the towel 1002 can be inserted into the second portion 104, which is hollow, and slid along the slit 1006. The rod 1004 is used to prevent the towel 1002 from falling out of the slit 1006. A cap 1008 may be attached to the distal end 114 of the second portion 104 to prevent the towel 1002 from sliding out of the second portion 104. The cap 1008 may be screwed on, pushed on and secured using a friction fit, snapped on, and/or the like.

In certain embodiments, a towel may include additional means for securing the towel to the second portion 104 such as magnets, straps, or the like, which may be used in combination with any of the foregoing means for securing a towel to the second portion 104.

Figure 11A:
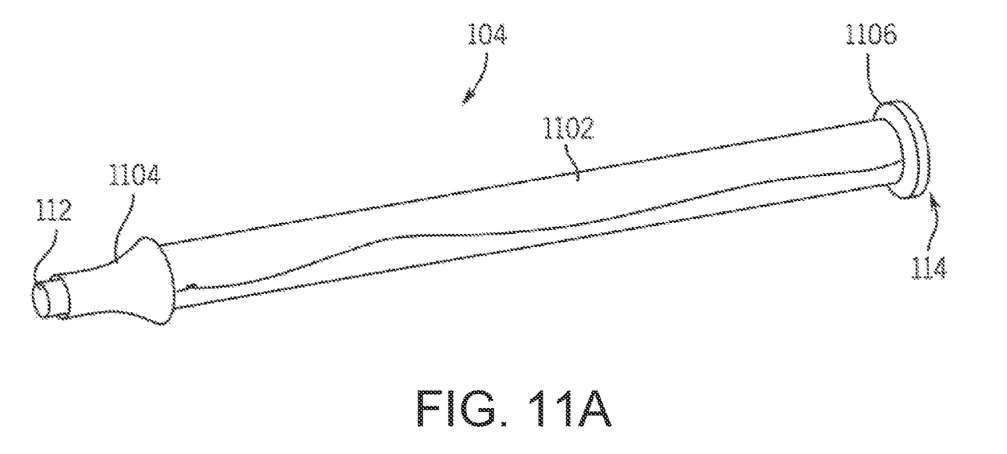
FIG. 11A is a perspective view of one embodiment of wringing a towel on an elongate member for a cleaning/drying system in accordance with the subject matter disclosed herein.
Figure 11B:
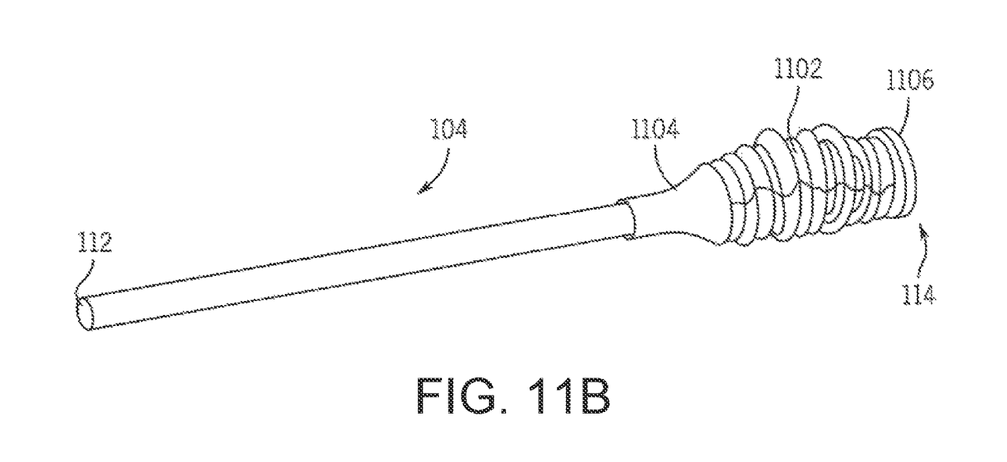
FIG. 11B is a perspective view of another embodiment of wringing a towel on an elongate member for a cleaning/drying system in accordance with the subject matter disclosed herein.

FIG. 11A depicts one embodiment of a wringing a used towel 1102. The towel 1102 may be substantially similar to the towel 502 described above with reference to FIG. 5. In one embodiment, the second portion 104 may include a plunger member 1104 that is located on or selectively coupled to the second portion 104. A cap 1106 may also be attached to the distal end 114 of the second portion 104 for preventing the towel 1102 from sliding off of the second portion 104. The towel 1102 may be rolled or wrapped around the second portion 104, e.g., the second portion 104 may be rotatable about a radial axis to roll or wrap the towel 1102 around the second portion 104. As shown in FIG. 11B, the plunger 1104 may be slidable along the length of the second portion 104 to compress the towel 1104 against the cap 1106 and wring liquid from the towel 1102.

Figure 12A:
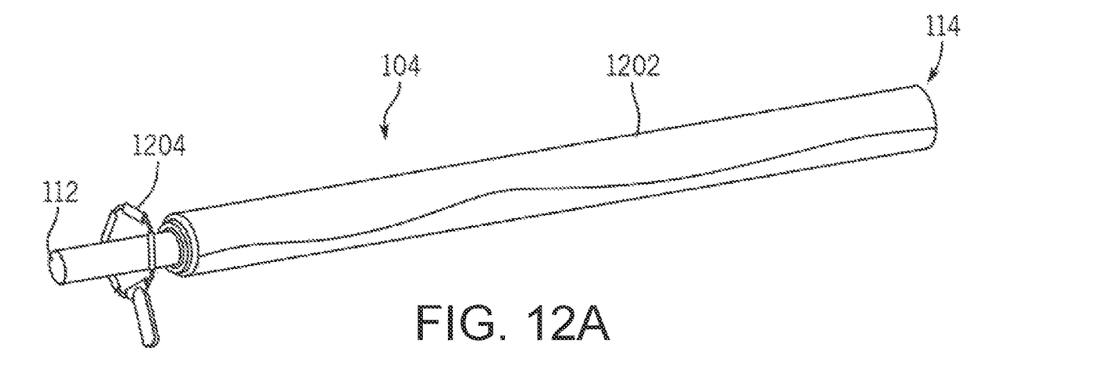
FIG. 12A is a perspective view of one embodiment of wringing a towel on an elongate member for a cleaning/drying system in accordance with the subject matter disclosed herein.

FIG. 12A depicts one embodiment of a wringing a used towel 1202. The towel 1202 may be substantially similar to the towel 502 described above with reference to FIG. 5. In one embodiment, the towel 1202 may be wrapped around the second portion 104, similar to the towel 1102 in FIG. 11A. A wringing member 1204 may be positioned at an edge of the wrapped towel 1202.

Figure 12B:
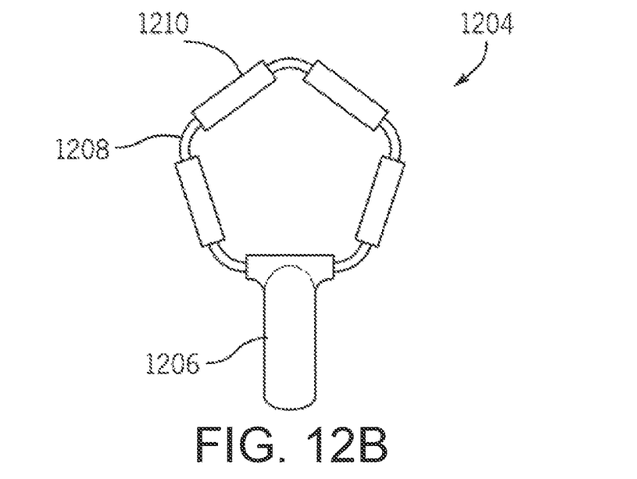
FIG. 12B is a perspective view of a wringing member for a cleaning/drying system in accordance with the subject matter disclosed herein.
Figure 12C:
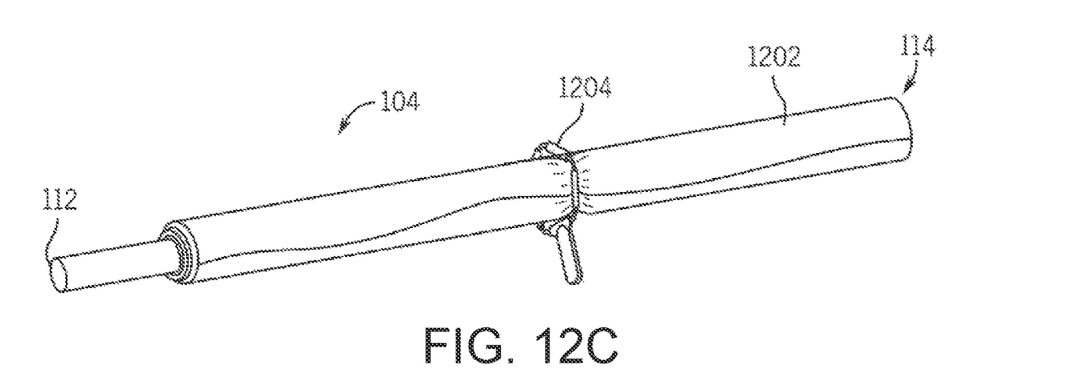
FIG. 12C is a perspective view of another embodiment of wringing a towel on an elongate member for a cleaning/drying system in accordance with the subject matter disclosed herein.

As shown in FIG. 12B, the wringing member 1204 may include a handle 1206 and a frame 1208 attached to the handle 1206. The frame 1208 may include a plurality of rollers 1210 that are configured to be rolled over a towel 1202 to wring liquid from the towel 1202. As shown in FIG. 12C, the wringing member 1204 may be rolled over the wrapped towel 1202, using the handle 1206, to actuate the rollers 1210 to compress the towel 1202 to wring liquid from the towel 1202.

Figure 13:
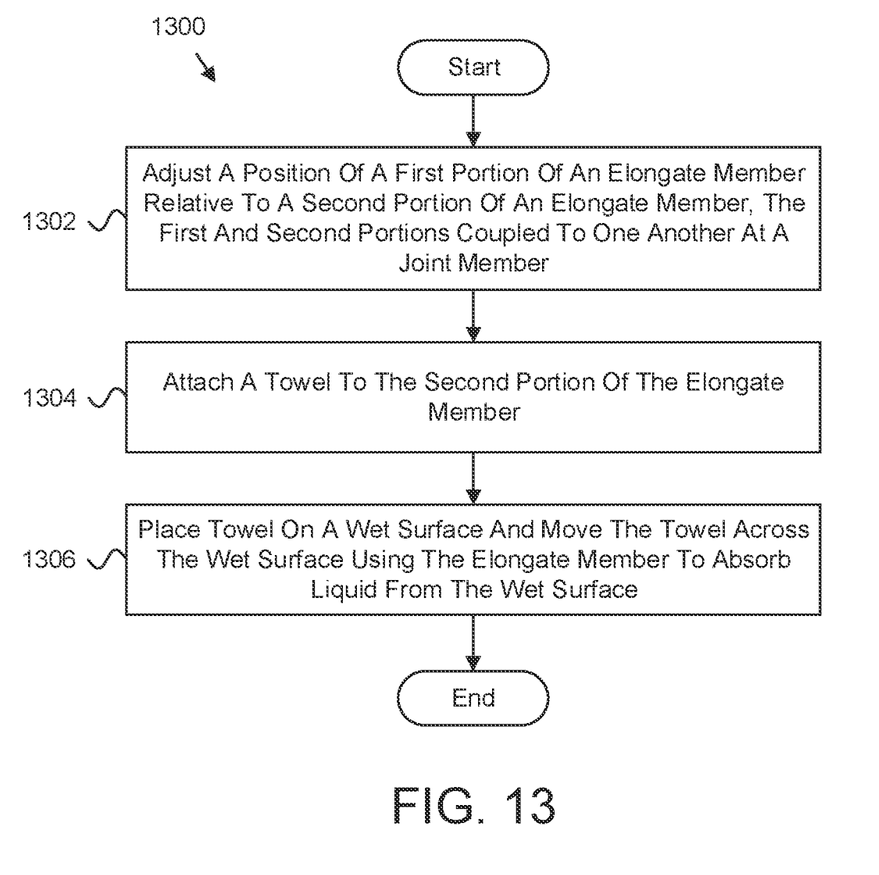
FIG. 13 is a schematic block diagram illustrating one embodiment of a method of using a cleaning/drying system in accordance with the subject matter disclosed herein.

FIG. 13 depicts a schematic flow chart diagram illustrating one embodiment of a method 1300 for using a cleaning/drying system as disclosed herein. In one embodiment, the method 1300 begins and adjusts 1302 a position of a first portion 102 of an elongate member 100 relative to a second portion 104 of an elongate member 100. In such an embodiment, the first 102 and second 104 portions are coupled to one another at a joint member 106.

The method 1300 attaches 1304 a towel to the second portion 104 of the elongate member 100. In certain embodiments, the method 1300 places 1306 the towel on a wet surface and moves the towel across the wet surface using the elongate member 100 to absorb liquid from the wet surface, and the method 1300 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   an elongate member comprised of a plurality of portions, the plurality of portions comprising at least a first portion comprising a first elongate member and a second portion comprising a second elongate member, the first and second portions coupleable to one another at a joint comprising a screw mechanism; and a towel selectively coupled to the second portion via an elastic sleeve at an edge of the towel that receives a length of the second elongate member of the second portion, the towel configured for absorbing liquids from a surface in response to the towel being moved across the surface using the elongate member.

2. The apparatus of claim 1, wherein the joint comprises a joint member that is adjustable such that the second portion is pivotably moveable about a radial axis relative to the first portion.

3. The apparatus of claim 2, wherein the joint member comprises a locking plate hinge that a proximal end of the first portion and a proximal end of the second portion are coupled to and that allows the second portion to pivot about the radial axis relative to the first portion.

4. The apparatus of claim 2, wherein the joint member comprises a locking ball joint that a proximal end of the first portion and a proximal end of the second portion are coupled to and that allows the second portion to pivot about the radial axis relative to the first portion.

5. The apparatus of claim 1, wherein the joint comprises a fixed angle joint that a proximal end of the first portion and a proximal end of the second portion are selectively coupled to.

6. The apparatus of claim 5, wherein a proximal end of the first portion and a proximal end of the second portion are connected to one another by an elastic cord that runs through the fixed angle joint such that the proximal end of the second portion is removable from the fixed angle joint while remaining connected to the proximal end of the first portion via the elastic cord running through the fixed angle joint.

7. The apparatus of claim 1, wherein at least one of the first portion and the second portion are telescopically extendable.

8. The apparatus of claim 1, further comprising at least one handle on the first portion for gripping the first portion, the at least one handle comprising one of a rubber grip, a strap, a foam handle, and a protruding handle that is oriented along a third axis that is perpendicular to the first axis.

9. The apparatus of claim 1, further comprising a clip attached to the first portion and configured to receive the second portion when the second portion is removed from the joint member.

10. The apparatus of claim 1, wherein the towel comprises a plurality of fasteners along an edge of the towel that selectively fit one or more corresponding fastener receiving members along a length of the second portion for securing the towel onto the second portion.

11. The apparatus of claim 10, wherein the plurality of fasteners and corresponding fastener receiving members comprises at least one of buttons, snaps, and hook-and-loop fasteners.

12. The apparatus of claim 1, wherein the second portion comprises a slit that an edge of the towel is configured to slide into to secure the towel to the second portion, the towel comprising a rigid member along an edge of the towel that prevents the towel from falling out of the slit, the distal end comprising a cap for preventing the towel from sliding out of the slit.

13. The apparatus of claim 1, wherein the second portion comprises a protruding hook near a proximal end of the second portion and the towel comprises a sleeve along an edge of the towel that includes a loop member at an opening of the sleeve that is fixed to the towel, the sleeve configured to receive the distal end of the second portion until the loop member is attachable to the protruding hook for securing the towel onto the second portion.

14. The apparatus of claim 1, wherein the second portion comprises one or more clips that are actuated to receive the towel and secure the towel to the second portion.

15. The apparatus of claim 1, wherein the second portion is rotatable along a radial axis for rolling the towel around the second portion.

16. The apparatus of claim 15, further comprising a plunger member that is slidable along a length of the second portion, the plunger member engaging the rolled towel and wringing liquid from the towel as the plunger slides along the length of the second portion.

17. A system, comprising:
an elongate member comprised of a plurality of portions, the plurality of portions comprising at least a first portion comprising a first elongate member and a second portion comprising a second elongate member, the first and second portions coupleable to one another at a joint comprising a screw mechanism;

a towel selectively coupled to the second portion via an elastic sleeve at an edge of the towel that receives a length of the second elongate member of the second portion, the towel configured for absorbing liquids from a surface in response to the towel being moved across the surface using the elongate member;

a foam handle grip coupled to a distal end of the first portion; and a cleaning attachment selectively coupled to a distal end of the second portion.

18. The system of claim 17, wherein the cleaning attachment is selected from the group consisting of a brush head, a squeegee, an absorbent pad, a mop head, a duster, and a sponge.

* * * * *